C. H. BRAWLEY.
CAR WHEEL GRINDER.
APPLICATION FILED JUNE 1, 1912.
1,050,915.
Patented Jan. 21, 1913.
2 SHEETS—SHEET 1.
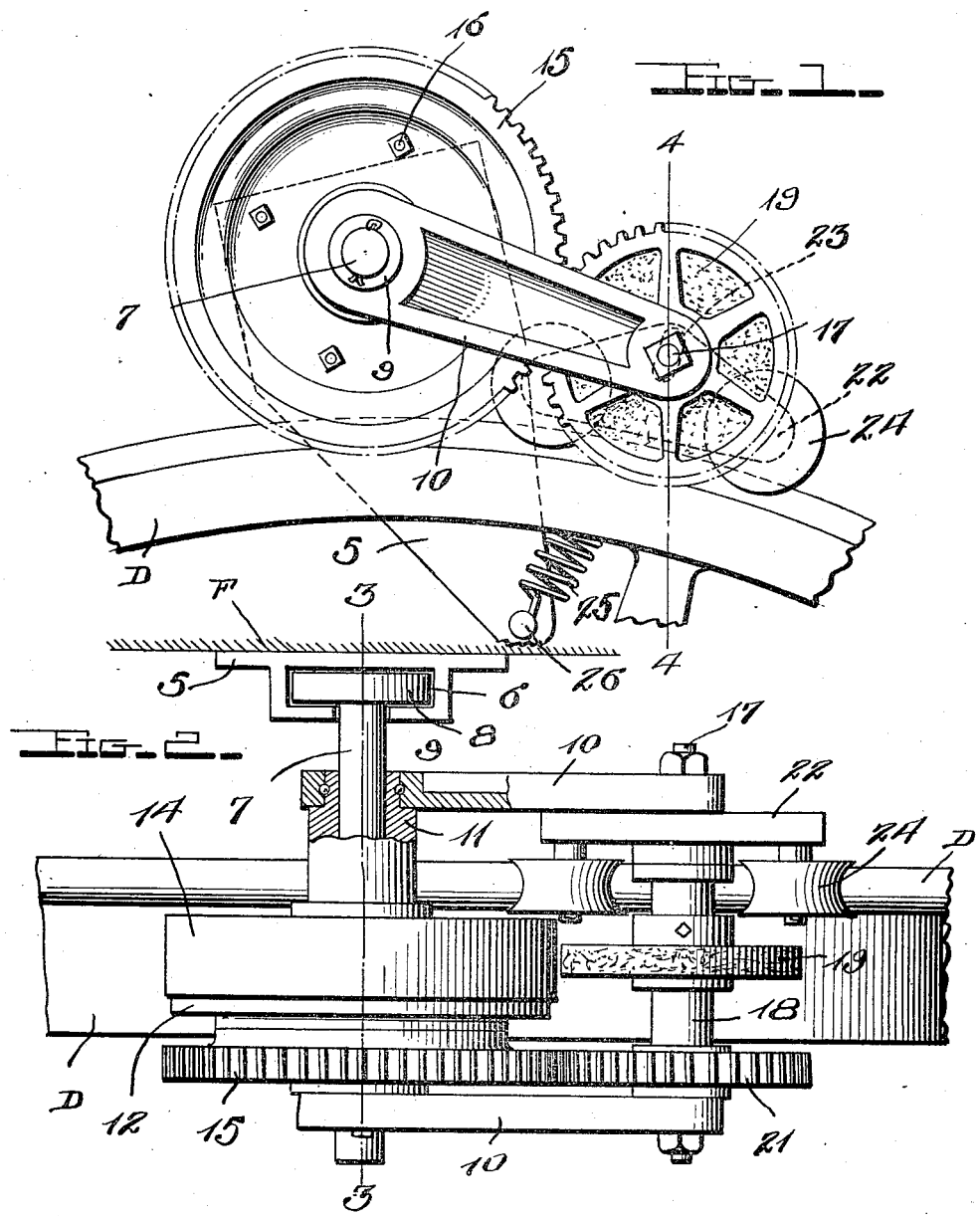
Witnesses
Chas. L. Griesbauer.
A. B. Norton
Inventor
C. H. Brawley,
By Watson E. Coleman
Attorney

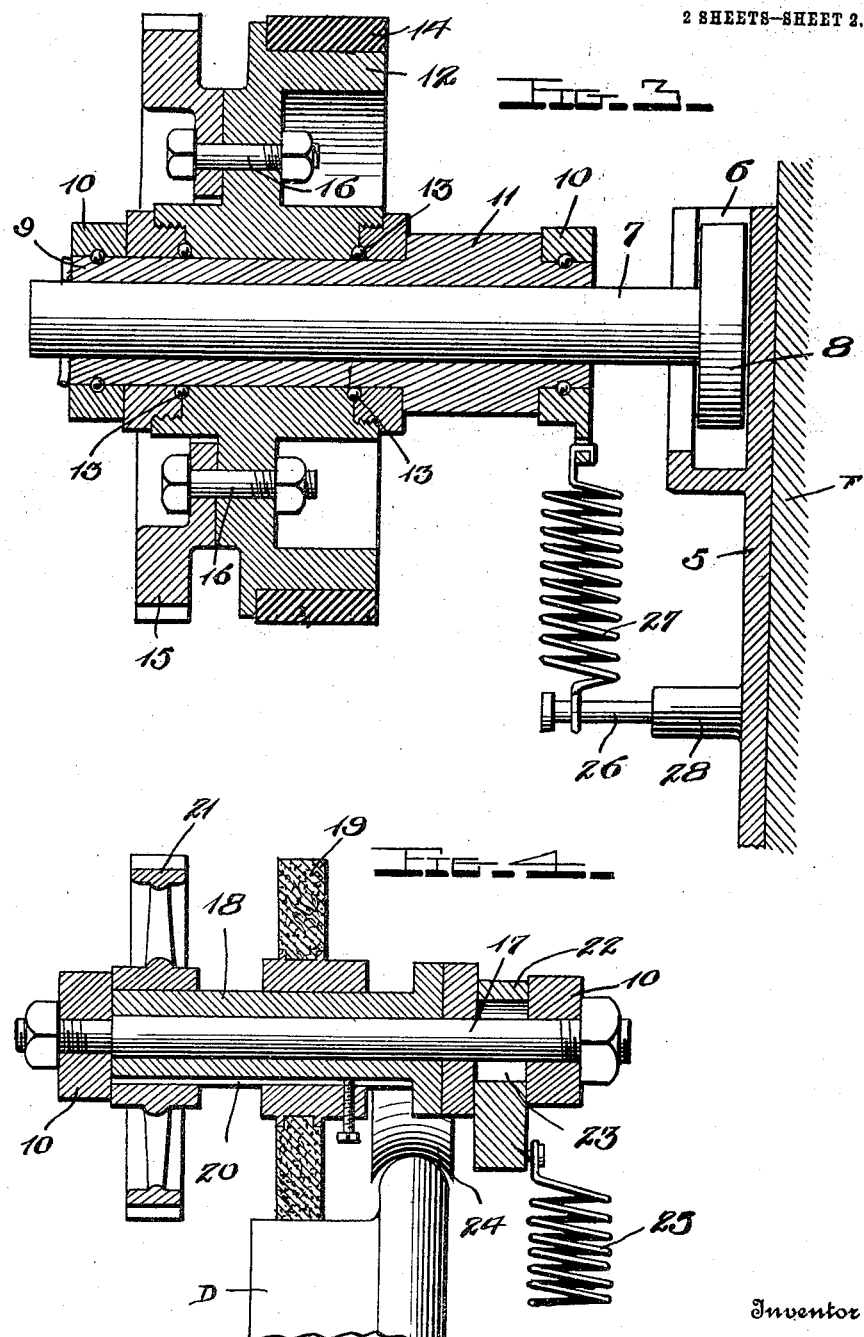

UNITED STATES PATENT OFFICE.

CHARLES H. BRAWLEY, OF WHITEFISH, MONTANA.

CAR-WHEEL GRINDER.

1,050,915.  Specification of Letters Patent. Patented Jan. 21, 1913.

Application filed June 1, 1912. Serial No. 701,070.

*To all whom it may concern:*

Be it known that I, CHARLES H. BRAWLEY, a citizen of the United States, residing at Whitefish, in the county of Flathead and State of Montana, have invented certain new and useful Improvements in Car-Wheel Grinders, of which the following is a specification, reference being had to the accompanying drawings.

This invention relates to improvements in truing devices for locomotive wheel tires and has for its primary object to provide a simple, durable and efficient device for this purpose mounted upon the frame of an engine and including an emery or other abrasive wheel engaging the tread surface of the wheel tire, and drive means also mounted upon the engine frame and engaging the tread surface of the wheel to transmit rotation to the abrasive wheel.

Another object of the invention is to provide means for retaining the abrasive wheel in engagement with the tire of the locomotive wheel and means for mounting and adjusting the abrasive wheel as the tread face of the tire is worn down.

Another and more specific object of the invention is to provide an arbor slidably mounted upon the engine frame, arms mounted upon said arbor at one of their ends and a bolt connecting the arms at their other ends, an abrasive wheel rotatably mounted upon the bolt between the arms, and driving means for said wheel rotatably mounted upon said arbor, said driving means being also longitudinally movable upon the arbor so that the same will maintain its engagement with the periphery of the locomotive wheel in the lateral movement of the same.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing in which—

Figure 1 is a side elevation of a tire truing device embodying the present invention; Fig. 2 is a top plan view certain of the parts being shown in section; Fig. 3 is a section taken on the line 3—3 of Fig. 2; and Fig. 4 is a section taken on the line 4—4 of Fig. 1.

Referring in detail to the drawing 5 designates a plate which is adapted to be bolted or otherwise rigidly fixed to the frame of the locomotive indicated at F. This plate is provided with a channel or guide way 6 to receive a head 8 formed upon one end of an arbor 7. Upon this arbor the sleeve or thimble 9 is loosely mounted, and to the opposite ends of this sleeve the parallel arms 10 are secured at one of their ends. One end of the sleeve 9 is diametrically enlarged as shown at 11 and between this enlarged portion of the sleeve and the other of the arms the drive wheel 12 is rotatably mounted upon said sleeve. The hub of this drive wheel is provided with suitable bearings shown at 13. A tire 14 of rubber or other material having high frictional resistance is secured upon the periphery of the wheel and is adapted to bear against the tread surface of the locomotive drive wheel shown at D. To one face of the wheel 12 a gear wheel 15 is secured by means of the bolts indicated at 16. The other ends of the parallel arms 10 are connected by means of a bolt 17 upon which the tubular hub or bushing 18 is mounted to rotate. A wheel 19 of emery or other abrasive material is splined upon this sleeve as shown at 20, and is adapted to bear against the tread face of the locomotive drive wheel D so as to grind the same in the rotation of said wheel and maintain a smooth surface upon the wheel tire for engagement with the tread of the rail. A gear wheel 21 is also splined upon the sleeve 9 and meshes with the gear wheel 15 whereby rotation is transmitted from the friction drive wheel 12 through the said gears to the abrasive wheel 19.

In order to guide the wheel 19 and maintain the same in a predetermined position with relation to the tread of the locomotive drive wheel, I provide a bracket plate 22 having an elongated slot 23 therein through which the bolt 17 extends. This bracket plate is arranged adjacent to one of the arms 10 and carries the spaced guide rollers 24, the peripheries of which are concave and receive the convex edge of the flange of the locomotive drive wheel D. A coil spring 25 has one of its ends secured to the bracket plate 22 and its other end fixed to a pin 26 projecting from the plate 5. A similar spring is also secured to the inner arm 10 at one of its ends and has its other end secured to a second pin 28 upon the plate 5. These springs act to yieldingly maintain the guide wheels and the friction bearing face of the drive wheel in engagement with the wheel of the locomotive. It will be understood from the above that by simply adjusting the rod 17, connecting the arms 10, in the slot 23 of the bracket plate 22, the abrasive wheel 19 may be disposed with relation to the tread surface of the locomotive drive wheel so that the frictional pressure of the abrasive wheel thereon and the consequent wear upon the tread of the drive wheel may be regulated as desired. By loosely mounting the sleeve 9 upon the arbor 7, the driving wheel 12 is free to move longitudinally upon the arbor in the lateral movement of the locomotive driving wheel when rounding a curve of the track. Thus undue wear upon the frictional face 14 of the wheel 12 is eliminated and said drive wheel is maintained in proper engagement with the tread engaging face of the wheel. Such sliding movement of the drive wheel is of course also transmitted to the abrasive wheel through the medium of the arms 10 so that the bearing face of said wheel upon the periphery of the locomotive driving wheel will maintain a constant position.

From the foregoing it is thought that the construction and manner of operation of my improved truing device for locomotive wheel tires will be clearly understood. In the movement of the engine and the rotation of the driving wheel, the abrasive wheel 19 bearing upon the periphery of said driving wheel grinds the tread engaging face of the tire so that a smooth surface is presented to the surface of the rail. As the pressure of the abrasive wheel upon the tire is the same at all points of the tire, the grinding action of the wheel will be equal throughout all portions of the tread surface of the tire which are engaged thereby. A device constructed in accordance with the present invention may be applied to the ordinary locomotive at a nominal cost. The device is also durable in construction, efficient in practical operation and may be inexpensively manufactured. While I have shown and described the preferred form and construction of the various parts, it will be obvious that the invention is susceptible of considerable modification without departing from the essential features of the invention or sacrificing any of the advantages thereof.

Having thus described the invention what is claimed is:

1. In combination, a vertically movable arbor, arms loosely mounted upon said arbor at one of their ends, a friction drive wheel rotatably and longitudinally movable upon the arbor between said arms and adapted to engage the periphery of a locomotive driving wheel, a rod connecting the other ends of said arms, an abrasive wheel rotatably mounted upon said rod to engage the periphery of the locomotive driving wheel, guide rollers mounted upon said rod bearing upon the flange of the driving wheel, and gearing on said rod and the friction drive wheel to transmit rotary movement to the abrasive wheel.

2. In combination, a guide, an arbor loosely mounted in said guide at one of its ends for vertical movement, arms loosely mounted upon the arbor, a rod connecting said arms, an abrasive wheel rotatably mounted on the rod to engage the tread face of the locomotive driving wheel, a bracket loosely mounted upon said rod, said rod being adjustable on the bracket to position the abrasive wheel with relation to the tread face of the driving wheel, guide rollers mounted upon said bracket to engage the flange of the driving wheel, a friction drive wheel rotatably mounted upon the arbor for engagement with the tread surface of the locomotive driving wheel, a gear carried by said friction wheel, and a gear mounted on the rod connecting said arms meshing with the gear of said friction wheel to transmit rotation to the abrasive wheel.

In testimony whereof I hereunto affix my signature in the presence of two witnesses.

CHAS. H. BRAWLEY.

Witnesses:
J. E. CAVANAUGH,
C. C. NISWONGER.

---

Copies of this patent may be obtained for five cents each, by addressing the "Commissioner of Patents, Washington, D. C."